United States Patent
Ammeraal et al.

(12) 
(10) Patent No.: US 6,536,585 B1
(45) Date of Patent: Mar. 25, 2003

(54) CONVEYOR, AS WELL AS CONVEYOR

(76) Inventors: Thomas Cornelis Maria Ammeraal, Zandweg 115, NL-1531 AM Wormer (NL); Wouter Balk, Prof. Tulpstraat 17, 1018 GZ Amsterdam (NL)

( * ) Notice: Subject to any disclaimer, the term of this patent is extended or adjusted under 35 U.S.C. 154(b) by 0 days.

(21) Appl. No.: 09/705,715

(22) Filed: Nov. 6, 2000

Related U.S. Application Data (63) Continuation-in-part of application No. PCT/NL99/00278, filed on May 6, 1999.

(51) Int. Cl.⁷ ............................................. B65G 17/06
(52) U.S. Cl. ........................................ 198/852; 198/778
(58) Field of Search ................................ 198/778, 831, 198/852, 844.1, 850, 851

(56) References Cited

U.S. PATENT DOCUMENTS

| | | | | |
|---|---|---|---|---|
| 967,424 A | * | 8/1910 | O'Toole | 198/831 |
| 3,870,142 A | * | 3/1975 | Woltjen | 198/850 |
| 4,055,265 A | * | 10/1977 | Eisenman | 198/844.1 |
| 4,084,687 A | * | 4/1978 | Lapeyre | 198/850 |
| 5,564,558 A | * | 10/1996 | Hampton et al. | 198/850 |
| 5,921,378 A | * | 7/1999 | Bonnet | 198/850 |

FOREIGN PATENT DOCUMENTS

| | | |
|---|---|---|
| EP | 0056912 | 8/1982 |
| FR | 2231588 | 12/1974 |
| FR | 2513288 | 3/1983 |
| FR | 2558448 | 7/1985 |
| GB | 2185725 | 7/1987 |

* cited by examiner

Primary Examiner—Joseph E. Valenza
(74) Attorney, Agent, or Firm—Wenderoth, Lind & Ponack, L.L.P.

(57) ABSTRACT

A conveyor for transporting parcel goods and the like over a track comprises a frame and an endless conveyor belt comprising a transport portion and a return portion, which is supported by the frame and which is driven by a driving device. The conveyor belt is provided with a number of elongated (in transverse direction), substantially rigid supporting elements, which are directly or indirectly interconnected and which can pivot relative to each other at least about an axis parallel to the plane of transport and perpendicularly to the direction of transport. Movable cover flaps projecting from the supporting elements in the longitudinal direction of the conveyor are formed on at least a number of supporting elements, wherein the length dimension of the flaps is such that each is capable of covering at least one gap to an adjacent supporting element.

23 Claims, 11 Drawing Sheets

CONVEYOR, AS WELL AS CONVEYOR

This is a Continuation-In-Part application of International Application PCT/NL99/00278, filed May 6, 1999. The entire contents of International Application PCT/NL99/00278 are incorporated herein by reference.

BACKGROUND OF THE INVENTION

The invention relates to a conveyor for transporting parcel goods and the like over a track.

Such conveyors are known in practice in various embodiments thereof. They are used for the horizontal or vertical transport of goods or as buffers in a production process. When they are used for transporting certain types of goods, problems may arise due to the presence of gaps between the rigid supporting elements, either constantly or temporarily when moving through a horizontal or vertical bend. When small goods or goods having projecting parts are transported, these goods may fall through the gaps or get wedged therein. Opening or closing gaps may furthermore constitute a safety problem, because a person's fingers may get wedged between the supporting elements.

The object of the invention is to provide a conveyor of the type referred to above, wherein the above-described problem has been overcome in an effective manner.

SUMMARY OF THE INVENTION

In order to accomplish that objective, the conveyor according to the invention is characterized in that movable cover flaps projecting from the supporting elements in the longitudinal direction of the conveyor are formed on at least a number of the supporting elements, wherein the length dimension of the flaps is such that each is capable of covering at least one gap to an adjacent supporting element.

These features according to the invention provide a closed transport surface, which prevents goods or projecting parts thereof from finding their way into the gaps between the supporting elements. Nor is it possible any more to stick one's fingers between the supporting elements. Because the cover flaps are movable, there will be no problems with projecting cover flaps when the belt passes from the transport portion to the return portion, which problems might interfere with the correct transfer or receipt of goods to or from other conveyors.

According to a first embodiment of the invention it is preferred to use cover flaps of a flexible material. Such cover flaps are suited to remain in abutment with the respective supporting elements at the location of the return pulleys.

When the cover flaps are separate parts which are attached to the supporting elements, the material of the cover flaps can be optimally selected to suit the function to be performed.

Thus, the supporting elements may be provided with an anti-slip profile, which is particularly favorable in the case of conveyors which must bridge a vertical distance and consequently will comprise a sloping transport portion. In that case the anti-slip profile can prevent the goods being transported from moving with respect to the conveyor belt.

In particular, in this embodiment provided with the anti-slip profile it is advantageous if each cover flap comprises a thin portion having a substantially smooth surface and a thicker portion provided with the anti-slip profile, wherein the thinner portion is present at least at the location of the supporting element to which the cover flap is attached and the thicker portion is present outside the supporting element, and wherein the thicker portion preferably overlaps at least part of the thinner portion of the cover flap of the adjacent supporting element.

In this manner the cover flaps are arranged in an overlapping relationship indeed, but because thinner portions are used, the difference in height at the free end of the cover flaps will remain minimal.

The shape of the cover flaps can be selected individually for each case, partially in dependence on the bends through which the conveyor belt must move. If the conveyor is arranged for moving through a bend curving around a vertically extending axis, it is advantageous if the width of the thinner and the thicker portions of each cover flap varies in longitudinal direction to accommodate the pivoting movement of the supporting elements relative to each other.

In another variant of the invention, the cover flaps are attached to the adjacent supporting elements, while the cover flaps comprise a loop-shaped fold between the adjacent supporting elements, and while the cover flaps can continue past at least a number of supporting elements.

In this manner an entirely closed transport surface is obtained in that the cover flaps are sealingly attached to adjacent supporting elements. The loop-shaped folds ensure that the mutual distance between the supporting elements can increase, for example at the location of end pulleys or on the outside of a bend in the conveyor track. Additionally or alternatively, the cover flaps may be elastic to offset differences in the distance between the adjacent supporting elements.

It is advantageous if the cover flaps are attached to the underside of all the supporting elements, preferably covering substantially the entire underside of the supporting elements.

This aspect makes it possible for the flaps to function as a sliding surface of the supporting elements. The arrangement of the cover flaps between the supporting elements and the guides positioned thereunder has a sound-damping effect, and when the material of the cover flaps is suitably selected, it is also possible to select a cheaper material for the guides, for example an inexpensive plastic material or steel.

The two sides of the cover flaps may each be formed with a different type of surface, such that the upwardly facing side of the cover flaps on the upper side of the supporting elements is provided with an anti-slip profile and the downwardly facing side of the cover flaps on the lower side of the supporting elements is provided with a surface having a low coefficient of friction.

In a further embodiment according to the invention, the flaps comprise rigid parts which are pivotally connected to each other about a pivot axis which is substantially parallel to the axis of the supporting elements.

The invention furthermore relates to a conveyor belt for use in a conveyor and to supporting elements for forming the conveyor belt.

The invention will be explained in more detail hereafter with reference to the drawings, which show embodiments of the conveyor according to the invention.

DESCRIPTION OF THE PREFERRED EMBODIMENTS

The drawings show one of the possible embodiments of the conveyor according to the invention, which in this case is intended for vertical transport along a helical path of products, in particular difficult parcel goods having projecting parts, such as bundles of newspapers, bundles of laundry and individual articles of laundry and also individual small products. In practice, such conveyors are also known as spiral conveyors or winding conveyors. These conveyors are capable of transporting products in a continuous flow.

Figure 1:
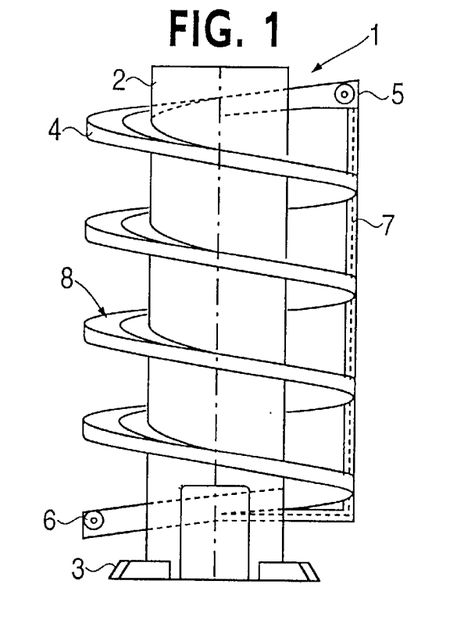
FIG. 1 is a side view of a conveyor according to the invention.

The conveyor as shown is provided with a frame 1, which comprises a central column 2 with bases 3 and a helical guide chute 4, which extends around column 2 and which is attached thereto. Also, all kinds of other frame constructions are conceivable, of course. An end pulley 5, 6 is provided at the upper and the lower end of the helical guide chute 4, and a return chute 7 of frame 1 extends between the ends of the helical guide chute 4. The conveyor belt 8 supported by frame 1 is guided along different paths in the transport portion and in the return portion. Embodiments wherein the transport portion is returned along the underside of guide chute 4 are also possible, however. The conveyor belt 8 can be driven via one end pulley 5, 6 or via both, or otherwise. The conveyor can be connected to further conveyors near the upper and the lower end pulley 5, 6.

Figure 2:
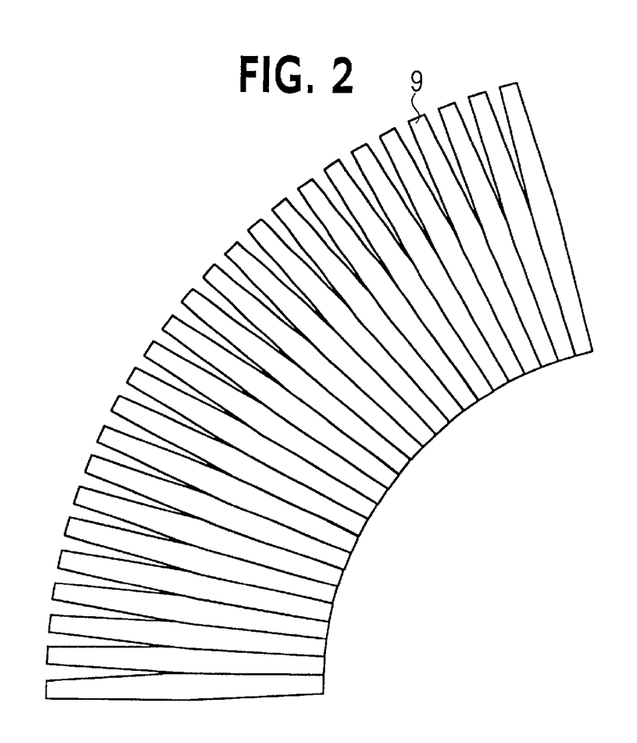
FIG. 2 is a plan view of a part of the conveyor belt of the conveyor of FIG. 1, wherein the cover flaps are not shown, however.

As is also shown, in particular in FIG. 2, conveyor belt 8 comprises a large number of slats which are interconnected, either directly or via an endless, elongated, flexible connecting element, such as a chain, a cable or the like. Each slat 9 has an upper, flat supporting surface, and the slats are arranged adjacently to each other in the transport portion, leaving open a gap between them, so that products can be supported by a number of adjoining slats 9. Slats 9 are pivotally interconnected in such a manner that they are capable of pivoting movement about a first axis parallel to the plane of transport and perpendicularly to the direction of transport, as well as about a second axis perpendicularly to the plane of transport and perpendicularly to the direction of transport. The latter pivoting movement enables the conveyor belt to move in a spiral path, while the former pivoting movement allows the conveyor belt to bend around end pulleys 5 and 6. Conveyor belt 8 could also be bent in another direction rather than over the end pulleys, that is, in an upward direction, albeit only with a relatively large radius of curvature.

Since the slats 9 taper slightly from their axes near their ends, the slats 9 do not interfere with each other in bends. This shape of the slats 9, however, leads to the formation of gaps between the adjacent slats 9, while the gaps are further enlarged at the location of the end pulleys since the slats 9 pivot about axes which are positioned some distance below the upper surface of the slats 9. The present invention provides means which cover the gaps 10 between slats 9 under all circumstances, so that a closed transport surface is provided at all times.

Figure 3:
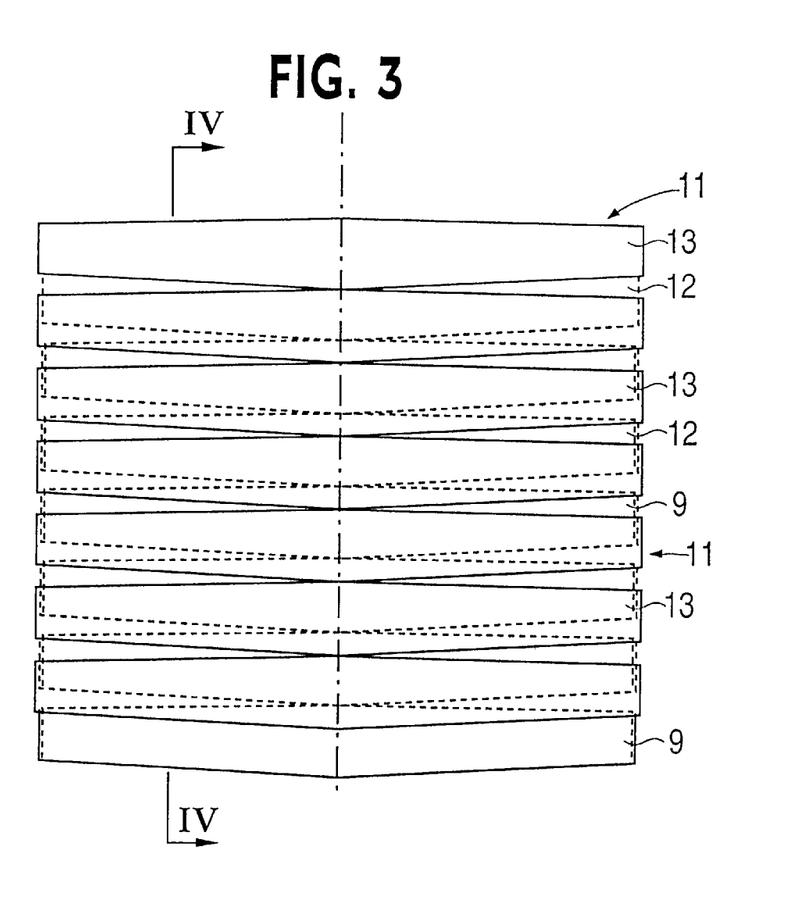
FIG. 3 shows two supporting elements arranged adjacently to each other, with flaps provided thereon.
Figure 4:
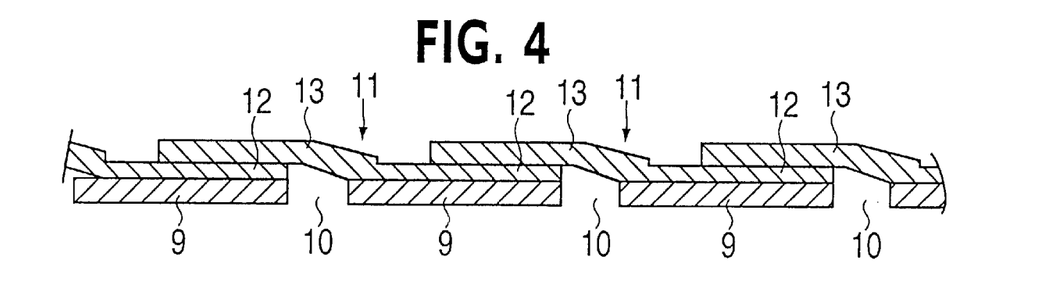
FIG. 4 is a sectional view along line IV—IV in FIG. 3.

FIGS. 3 and 4 show these means, which consist of cover flaps 11. In this embodiment, each slat 9 has an associated cover flap 11 attached thereto, which projects over the adjacent slat 9 on one side. Preferably, each cover flap 11 extends rearwardly, seen in the direction of transport of the conveyor. In the case of a two-way spiral conveyor, the cover flap preferably extends downwardly. The downward force keeps the cover flaps 11 taut.

Each cover flap 11 may for example be made of a fabric provided with a coating of a synthetic material. The fabric may for example consist of cotton, polyester or the like, while the coating may consist of PVC, PU, rubber, PE and the like. Each cover flap 11 may be attached to the associated slat 9 in any suitable manner, for example by glueing, screwing, clamping, welding, stapling and the like. The fabric is preferably so designed that it is flexible about an axis parallel to the slat 9 and more rigid about an axis parallel to the longitudinal direction of the conveyor belt.

As is shown in FIG. 4, the illustrated embodiment of cover flap 11 comprises a thinner portion 12 and a thicker portion 13. Thinner portion 12 is attached to the associated slat 9, while thicker portion 13 extends over the gap and over a large part of thinner portion 12 of the cover flap 11 of the adjacent slat 9. Thicker portion 13 is provided on the upper side with an anti-slip profile, which prevents transported goods from sliding with respect to conveyor belt 8, and which enables a relatively large rising angle of the spiral.

The underside of thicker portion 13 and/or the upper side of thinner portion 12 are preferably smooth or have a low coefficient of friction so as to make it easier for the adjacent flaps to slide over each other. The sliding over each other will take place in bends, where adjacent slats 9 pivot about a vertical or a horizontal axis relative to each other, whereby the spacing between the slats varies or the shape of the gap changes. The dimensions and shapes of cover flaps 11 and/or of portions 12 and 13 thereof are selected in dependence on the bends through which the conveyor belt 8 must move. In the illustrated embodiment, the width of thicker portion 13 of each cover flap 11 decreases from the center towards the ends, because the adjacent slats 9 pivot in such a manner with respect to each other in the bends that they will abut practically completely against each other in the inside bend. In order to prevent thicker portion 13 of each cover flap 11 from coming into contact with the thicker portion 13 of a next cover flap 11, the free end of each thicker portion 13 is cut away obliquely, starting from the center. When the conveyor only moves through a bend in one direction, the half of thicker portion 13 that is positioned on the other side of the center line may be straight.

Figures 5, 6:
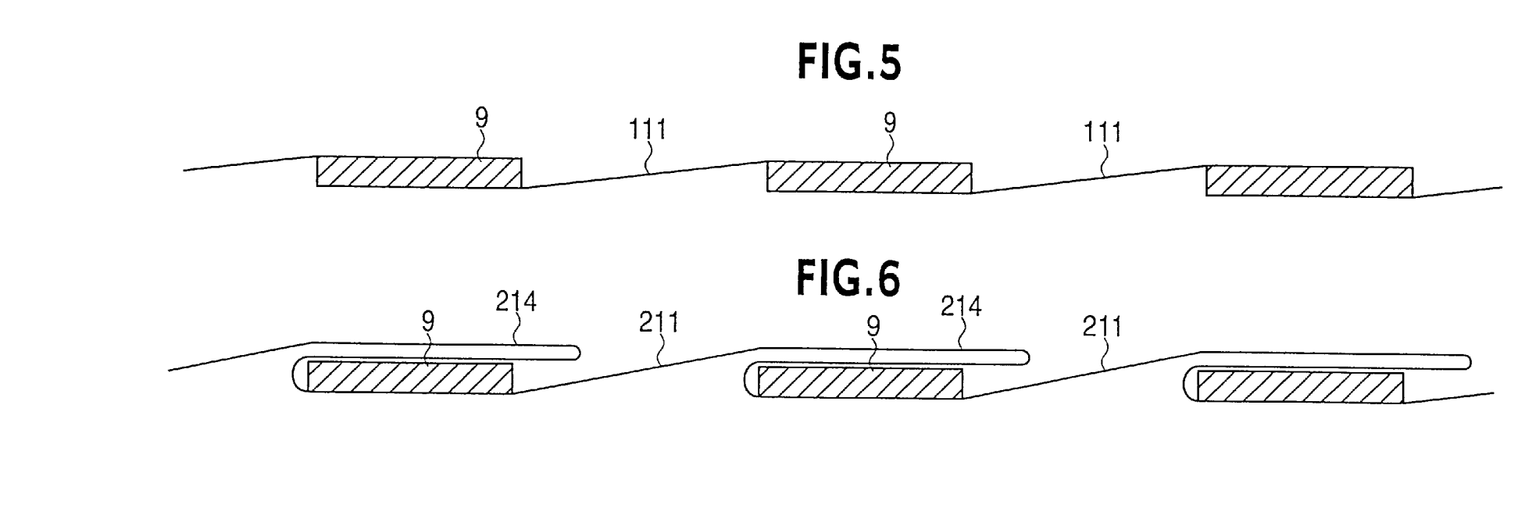
FIG. 5 is a sectional view corresponding to FIG. 4 of a second embodiment of the conveyor according to the invention.
FIG. 6 is a sectional view corresponding to FIG. 4 of a third embodiment of the conveyor according to the invention.

FIG. 5 shows a second embodiment of the conveyor according to the invention. In this variant, the cover flaps 111 are not attached to the upper side of a slat 9, but to the underside thereof. Cover flap 111 projects to one side of the respective slat 9 and overlaps, as seen in the direction of transport (arrow), the rearwardly adjacent slat 9 on the upper side. The advantage of this variant is that the cover flap 111 not only has a sealing function, but also a guiding function. The presence of a cover flap 111 between each slat 9 and guides supporting the slat dampens any vibrations or flapping, and thus has a sound-damping effect. Furthermore, the lower surface of each cover flap 111 can be designed to have advantageous friction and guiding properties, so that the requirements to be made of the supporting guides can be less stringent and the guides can be made of a cheaper plastic material or even of steel. The upper surface of the cover flaps 111, on the contrary, may have a large coefficient of friction so as to prevent the goods being transported from sliding.

FIG. 6 shows yet another embodiment, wherein adjacent cover flaps 211 form one whole, so that they continue over several slats 9 and are attached to the various slats 9. In this embodiment, the cover flap 211 is first guided under each slat 9 and subsequently folded over the slat 9, after which the cover flap 211 is folded back again, forming a loop-shaped fold 214, and continues to the next slat 9. The loop-shaped fold 214 ensures that the distance between the adjacent slats 9 can increase, for example upon passing an end pulley 5, 6 (FIG. 1) or on the outside of a bend to be moved through. The advantage of this embodiment is that an entirely closed transport surface is provided by the continuous flaps 211. Also, embodiments wherein only one separate cover flap 211 is positioned between respective two adjacent slats 9, which cover flap will abut with its end side against the next cover flap 211 at the location of slat 9, and/or wherein the adjacent cover flaps 211 are sealingly attached to the respective slat 9 are possible, of course. On the other hand, the material of the cover flaps 211 can continue without interruption over a large number of slats 9.

Figure 7:
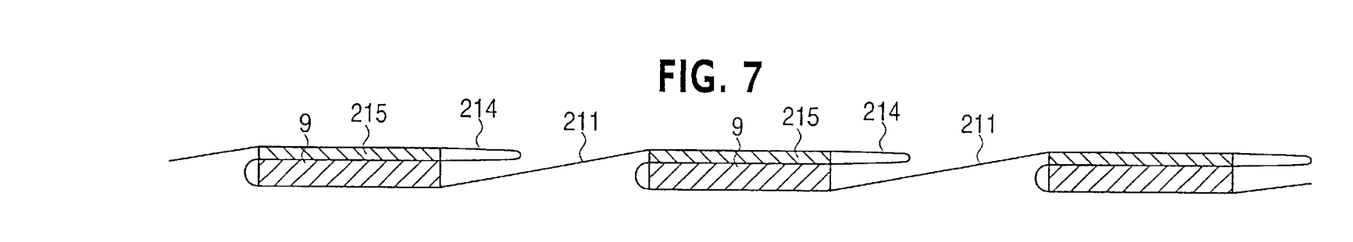
FIG. 7 is a sectional view corresponding to FIG. 4 of a fourth embodiment of the conveyor according to the invention.
Figure 8:
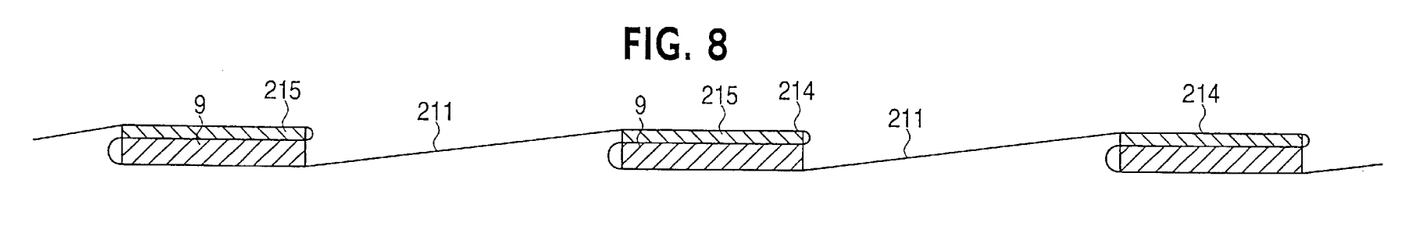
FIG. 8 is a sectional view corresponding to FIG. 7, wherein the supporting elements have moved apart at the location of a return pulley.

FIGS. 7 and 8 show a variant corresponding with FIG. 6, wherein the cover flap 211 is attached to the upper side of each slat 9, for example by means of a screwed or rivetted mounting strip 215, which preferably has the same contour as the slat 9 present thereunder. This method is an alternative for methods such as glueing, rivetting and the like. When mounting strip 215 is used, cover flap 211 is clamped between mounting strip 215 and slat 9, while cover flap 211 subsequently extends over mounting strip 215, via loop-shaped fold 214, to the next slat 9.

The cover flaps according to these embodiments may be very thin, for example thinner than 1 mm, Cover flaps 211 may be elastic, although in principle this is not necessary, and instead of being formed of a non-elastic material they may also be formed of an elastic netted fabric or of an elastic foil of rubber or plastic material.

A further preferred embodiment of a flap structure for the conveyor belt in the conveyor according to the invention comprises a plurality of rigid parts which are pivotally connected to each other in a manner so that they pivot about a pivot axis which is substantially parallel to the axis of the respective slats, i.e. extending parallel to the plane of transport and perpendicularly to the direction of transport. With respect to these embodiments it is noted that one of the rigid parts may act as a slat or other supporting element.

Figures 9, 10, 11, 12, 13, 14:
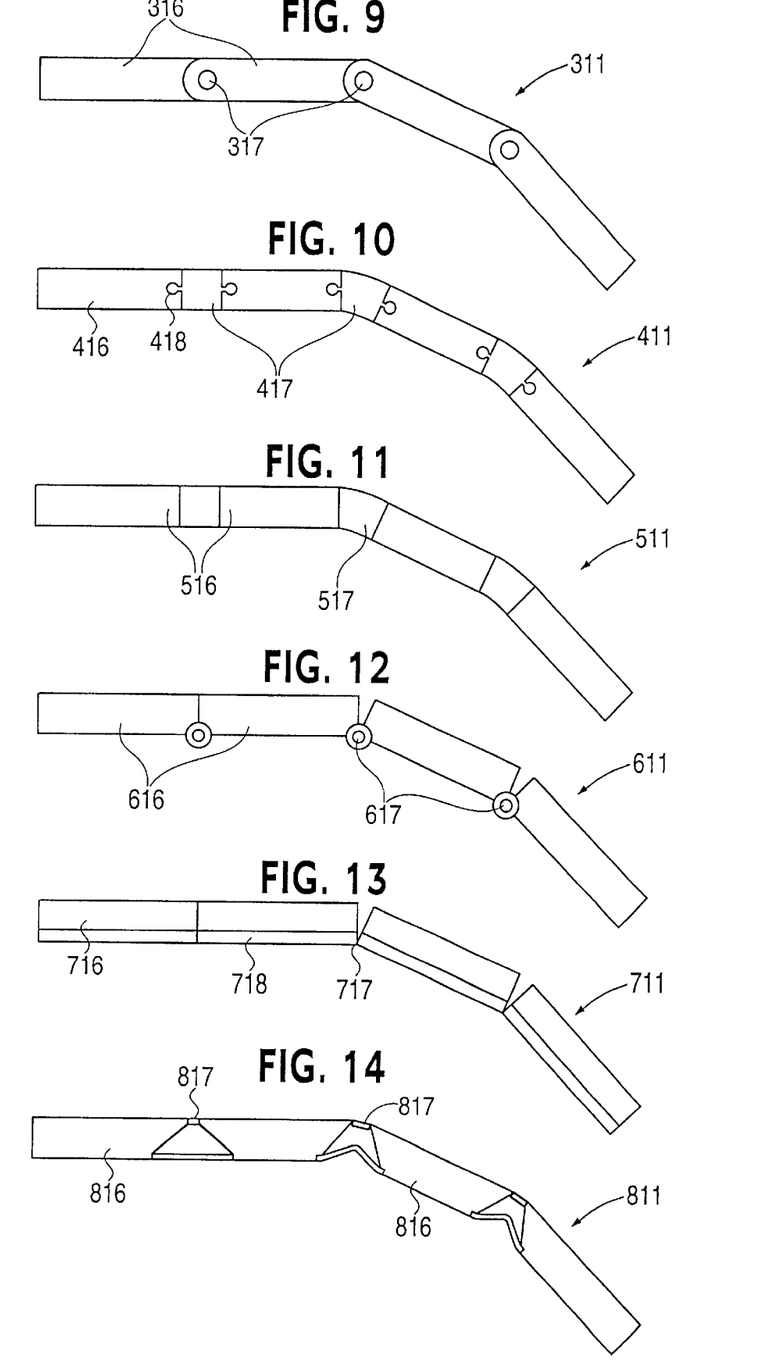
FIGS. 9–14 are schematic side views of various embodiments of flaps of the conveyor according to the invention, wherein the flaps comprise flexibly connected rigid parts.

FIG. 9 shows a first very schematic embodiment of such flap 311 comprising four rigid parts 316 which are connected to each other by pin-hole connections 317 which allow a pivoting movement of the adjacent rigid parts 316.

FIG. 10 shows a flap 411 comprising four rigid parts 416 interconnected by flexible elements 417 which are locked to the adjacent rigid parts 416 through fixing means 418.

FIG. 11 shows a further variant of FIG. 10, wherein a flap 511 comprises rigid parts 516 interconnected by flexible elements 517, which rigid parts and flexible pivoting elements are made by co-extrusion in one extruding step. In this manner, no separate assembly nor fixing means are necessary.

FIGS. 12, 13 and 14 are embodiments in which only a pivoting movement of adjacent rigid parts is possible in a downward direction to allow the flaps to follow the conveyor belt upon the passage over an end pulley, but which flaps behave rigidly when they are loaded from above in the transport part of the conveyor.

FIG. 12 is a first embodiment showing a flap 611 including a plurality of rigid parts 616 which abut when they are aligned with each other. These rigid parts are interconnected on their lower sides through a mechanical pivot allowing the downward pivoting movement.

FIG. 13 shows an alternative embodiment of a flap 711 including a plurality of rigid parts 716 which are interconnected by a layer 718 of flexible material, which is attached to the lower side of the rigid parts 716 such that this flexible layer forms flexible connections 717. The rigid parts 716 and layer 718 of flexible material may be made by co-extrusion or as separate parts.

FIG. 14 shows a flap 811 including a plurality of rigid parts 816. The shape of the rigid parts 816 is such that they substantially abut at their upper sides and are spaced from each other on their lower sides so that adjacent rigid parts may pivot relatively about their abutting upper sides through flexible parts 817. On their lower sides, the adjacent rigid parts 816 are connected by a stop member which is flexible and is taut when two adjacent rigid parts 816 are aligned, thereby allowing only a downward pivoting movement.

Figure 15:
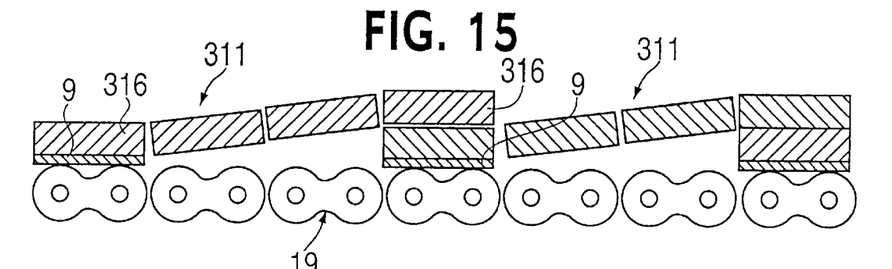
FIGS. 15–18 are longitudinal sectional views showing two supporting elements-and flaps, and illustrating different ways of connecting the supporting elements and flaps to the connecting roller chain.

FIGS. 15–18 illustrate various ways of connecting slats and flaps to a roller chain 19. An example of a conventional connection between such roller chain 19 and slats is illustrated in European patent application 1 009 692, the contents of which are incorporated herein. The slats 9 have a respective flap connected thereto, which flap may for example be constructed as one of the flaps of the embodiments of FIGS. 9–14. In FIG. 15, one of the rigid parts 316 of the flaps is attached on top of the slat 9 or a connecting part of the chain 19, whereas the rigid part 316 at the free end of such flap 311 rests on top of the adjacent slat 9 or rigid part 316 of the adjacent flap 311. In the embodiment of FIG. 15, each slat is connected in a fixed manner at one point to a link of the roller chain 19.

Figure 16:
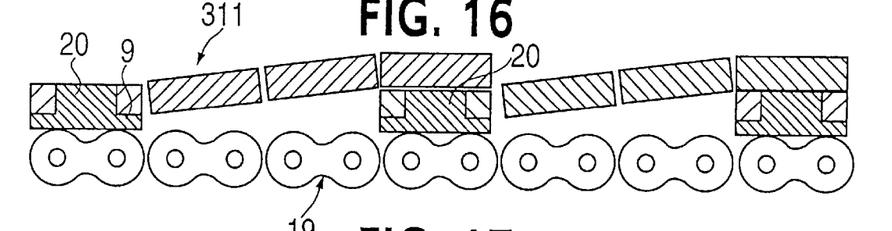

In the embodiment of FIG. 16, there is a flexible connection between each slat 9 and a link of the chain 19, which flexible connection comprises a (non-circular, see FIG. 19) shaft 20 extending perpendicularly to the plane of the conveyor belt. The free end of each flap 311 is still resting freely on the adjacent slat 9.

Figure 17:
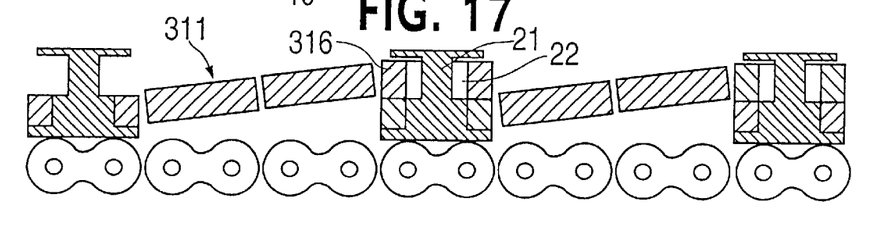

In the embodiment of FIG. 17, the shaft 20 also includes a contact element 21 on each shaft 20, which contact element extends through a slotted hole 22 in the rigid part 316 at the free end of the flap 311 and is shaped so as to hold the flap 311 in contact with the adjacent slat of the conveyor belt, but to allow for a sliding movement to compensate for length variations in the conveyor belt when this is circulated around an end pulley.

Figure 18:
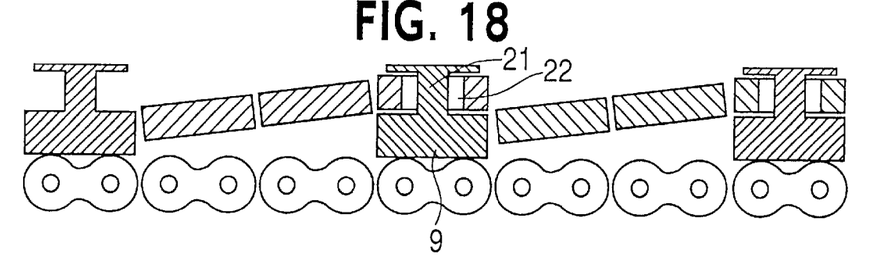

FIG. 18 shows a further embodiment in which the contact element 21 is formed directly on the slat or rigid element acting as a slat.

Figure 19:
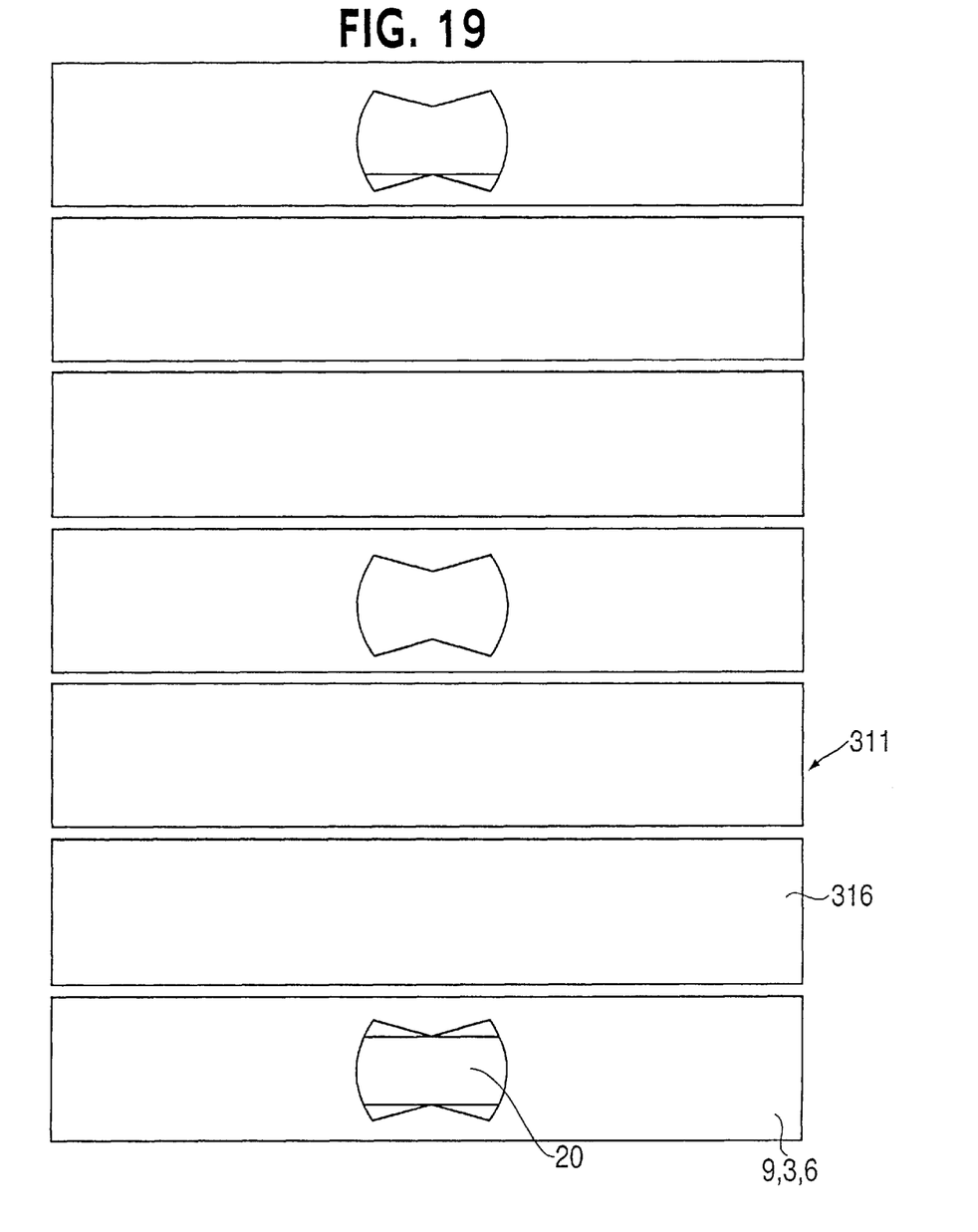
FIG. 19 is a plan view of the supporting elements and slats of FIG. 16.

FIG. 19 is a plan view of the embodiment of FIG. 16 showing the flexible connector 20 to allow a rotation around an axis perpendicularly to the plane of transport.

FIGS. 20–24 illustrate further contact means which are intended to keep the free ends of the respective flaps 311–811 in contact with the adjacent slat or adjacent flap on which it rests.

Figures 20, 21:
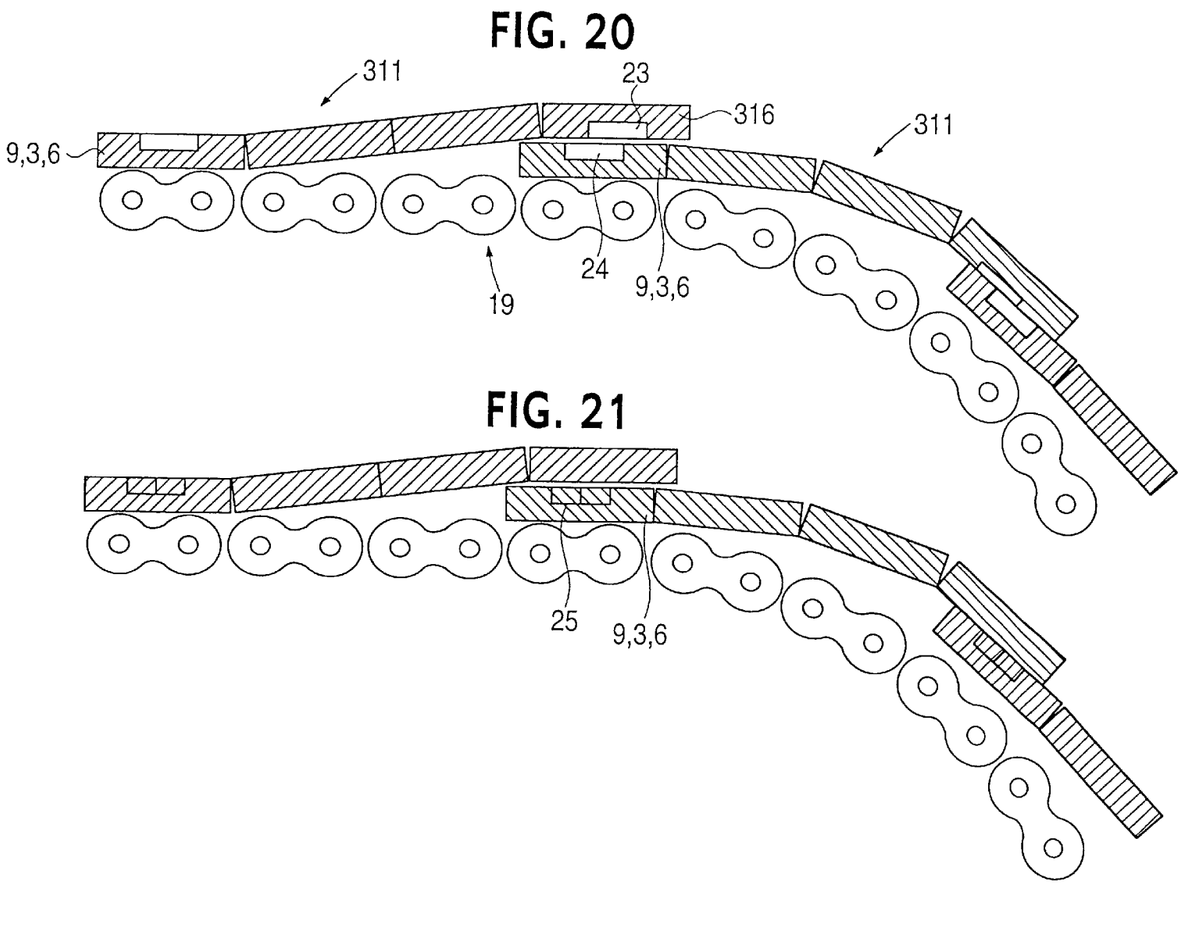
FIGS. 20–24 are longitudinal sectional views showing a number of supporting elements and flaps at the position of an end pulley, and illustrating various manners by which the flaps are maintained in contact with an adjacent supporting element.

In FIG. 20, the contact means comprises magnetic elements, for example a magnetic element 23 in the rigid part 316 and a counter magnetic element 24 in the adjacent slat 9 or rigid part 316 of the adjacent flap 311. The magnetic forces are such that they allow a sliding movement between the parts that are kept in contact with each other.

FIG. 21 shows a further contact means 25, for example consisting of small channels in which an underpressure is created when the respective slat or rigid part 9, 316 is at a position of the respective end pulley (now shown).

Figures 22, 23:
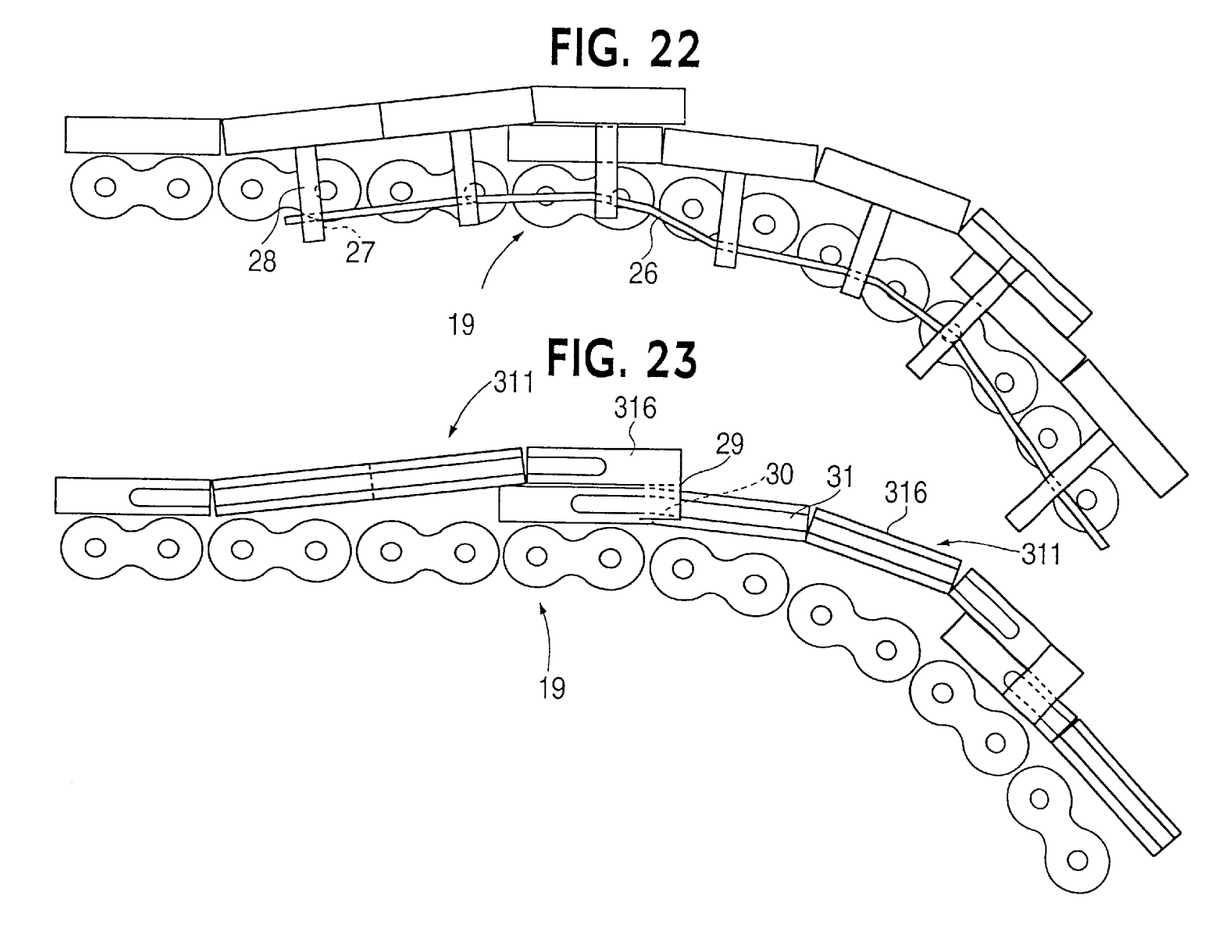

In FIG. 22 the contact means comprises a flexible thread or wire 26 which is threaded through openings 27 in projections 28 which are attached to the lateral ends of the rigid parts 316 of the flaps 311.

FIG. 23 shows another embodiment in which the rigid part 316 at the free end of each flap 311 has hooks on the lateral ends thereof, with a pin 30 engaging in longitudinal slots 31 in the rigid parts 316 of the adjacent flap 311.

Figures 24A, 24B:
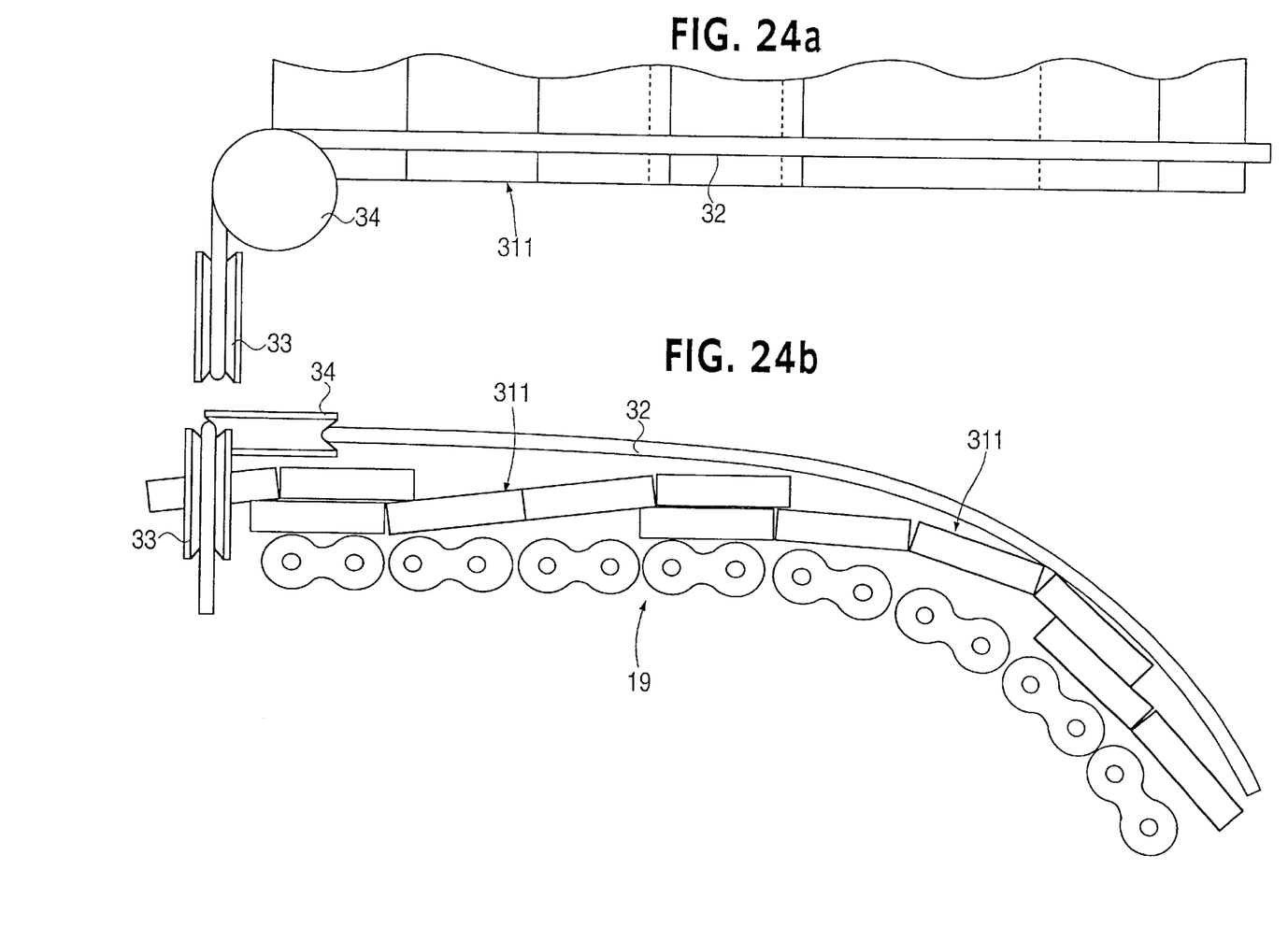

FIGS. 24a and 24b show a different solution including local contact means in the form of an endless tying element 32, such as a cord, rope or belt, which is guided around pulleys 33 and 34 in order to guide the tying element against the flaps 311 near the side edge thereof. The tying element 32 follows a path where the conveyor belt is in contact with an end pulley (not shown), i.e. where the conveyor belt is curved and where the flaps need to be held down.

Figure 25:
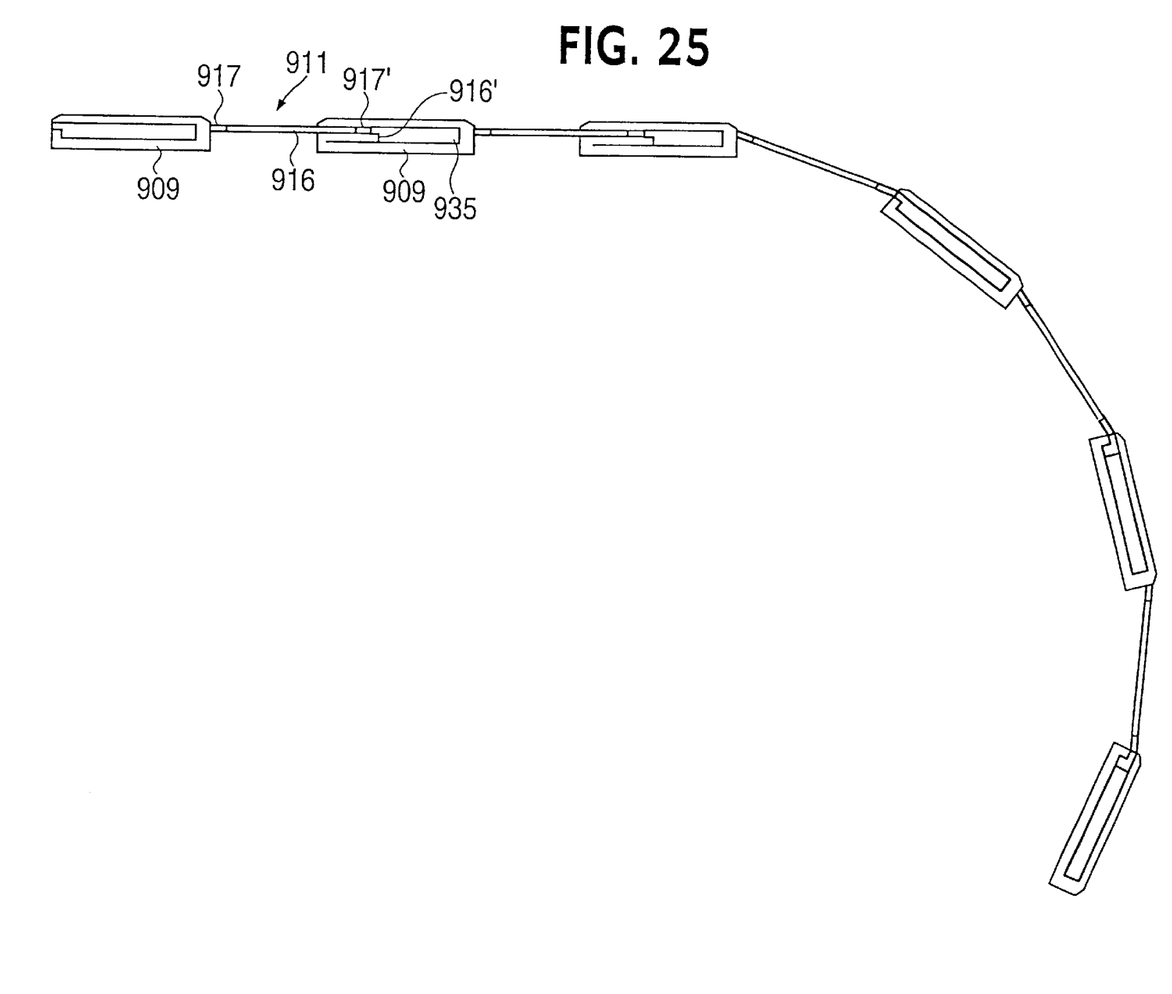
FIG. 25 schematically shows a further embodiment of a conveyor belt including supporting elements and flaps.

FIG. 25 shows another embodiment of a conveyor belt comprising slats 909 and flaps 911. These flaps 911 consist of a first rigid part 916 and a second hook-like rigid part 916'. The rigid part 916 is connected to the slat 909 through a flexible pivot 917 and both rigid parts 916 and 916' are connected through a flexible pivot 917'. The flap of one slat 909 engages in a cavity 935 of the adjacent slat 909 such that the flap may slide in this cavity 935, but prevents the hooked rigid part 916' from leaving the cavity 935.

In this arrangement, when the slats 909 are in a transport part as shown on the left side in FIG. 25, the flap 911 behaves rigidly because only rigid part 916 protrudes from the cavity 935. During passage over an end pulley, the adjacent slats 909 move apart such that only the hooked rigid part 916' is within the cavity 935 so that the flexible pivots 917 and 917' may act as pivots and allow pivoting movement of the rigid part 916 with respect to the adjacent slats 909.

From the foregoing it will be apparent that the invention provides a conveyor and a conveyor belt which is remarkable for providing a closed transport surface under all circumstances while retaining the advantages of separate rigid supporting elements. The closed transport surface ensures a trouble-free and safe operation of the conveyor.

The invention is not restricted to the above-described embodiment as shown in the drawings, which can be varied in several ways without departing from the scope of the invention. Thus, it would for example be possible to attach one cover flap to respective two members, which cover flap in that case will extend from a supporting element over the adjacent supporting element on either side, or which projects over two supporting elements on one side. Also, other combinations are conceivable. The cover flaps may have a constant thickness over their entire surface area and be positioned in an overlapping relationship. This may be the case in particular in those cases where no anti-slip profile is used. The invention is furthermore suitable for use in other conveyors, such as straight conveyors, circular conveyors, conveyors comprising left-hand and right-hand bends and combinations of conveyor forms. The present invention can also be used in feeding and discharging conveyors comprising an upward or a downward change of level.

What is claimed is:

1. A conveyor for transporting articles over a track, comprising:
    a frame;
    an endless conveyor belt supported by said frame and to be driven by a driving device, said endless conveyor belt including transversely elongated substantially rigid supporting elements that define a transport portion and a return portion of said endless conveyor belt, said transversely elongated substantially rigid supporting elements being directly or indirectly interconnected with one another and pivotable relative to one another about an axis that is parallel to a plane of transport of said endless conveyor belt and perpendicular to a direction of transport of said endless conveyor belt, with adjacent ones of said transversely elongated substantially rigid supporting elements defining a gap therebetween;
    movable cover flaps attached to and projecting from at least some of said transversely elongated substantially rigid supporting elements in a longitudinal direction of said endless conveyor belt, said movable cover flaps each being of a length sufficient to cover a corresponding one of the gaps defined between said adjacent ones of said transversely elongated substantially rigid supporting elements,
    wherein said movable cover flaps each comprise rigid parts that are pivotally connected to one another about a pivot axis which is substantially parallel to an axis of a corresponding one of said transversely elongated substantially rigid supporting elements.

2. The conveyor according to claim 1, wherein said pivot axis is defined by flexible material that is connected to adjacent ones of said rigid parts.

3. The conveyor according to claim 2, wherein said flexible material is connected to said adjacent ones of said rigid parts by performing a single co-extrusion operation.

4. The conveyor according to claim 1, wherein said transversely elongated substantially rigid supporting elements comprise slats that are interconnected with one another via an elongated endless flexible connecting element.

5. The conveyor according to claim 4, wherein said elongated endless flexible connecting element comprises a roller chain.

6. The conveyor according to claim 5, wherein each of said slats and a corresponding one of said movable cover flaps are connected to said roller chain at a position of said each of said slats.

7. The conveyor according to claim 5, wherein each of said slats and a corresponding one of said movable cover flaps are connected to said roller chain at a position below said each of said slats and at a position below a free end of said corresponding one of said movable cover flaps.

8. The conveyor according to claim 7, wherein said corresponding one of said movable cover flaps is slidably connected to said each of said slats as viewed in a direction of transport of said endless conveyor belt.

9. The conveyor according to claim 4, wherein each of said slats and a corresponding one of said movable cover flaps are connected to said elongated endless flexible connecting element at a position below said each of said slats and at a position below a free end of said corresponding one of said movable cover flaps.

10. The conveyor according to claim 9, wherein said corresponding one of said movable cover flaps is slidably connected to said each of said slats as viewed in a direction of transport of said endless conveyor belt.

11. The conveyor according to claim 4, wherein each of said slats and a corresponding one of said movable cover flaps are connected to said elongated endless flexible connecting element at a position of said each of said slats.

12. The conveyor according to claim 1, wherein one of said rigid parts of each of said movable cover flaps supports another of said rigid parts of an adjacent one of said movable cover flaps.

13. The conveyor according to claim 1, wherein said pivot axis is defined by a pivot shaft that interconnects adjacent ones of said rigid parts.

14. The conveyor according to claim 1, wherein said rigid parts are pivotally connected to one another such that said rigid parts are only pivotable about said pivot axis in a downward direction from a position in which said rigid parts are substantially aligned with one another.

15. The conveyor according to claim 14, wherein said rigid parts abut one another when substantially aligned with one another, and further comprising a continuous layer of flexible material attached to a lower side of each of said rigid parts, wherein said pivot axis is defined by said continuous layer of flexible material at a position between said rigid parts.

16. The conveyor according to claim 14, wherein when said rigid parts are substantially aligned with one another respective upper sides thereof nearly abut with one another and are spaced from one another by a distance which is less than a distance that respective lower sides of said rigid parts are spaced from one another, and further comprising:
 a flexible part interconnecting said respective upper sides of said rigid parts; and
 a flexible strip interconnecting said respective lower sides of said rigid parts,
 such that said pivot axis is defined by said flexible part, and said flexible strip is taut when said rigid parts are substantially aligned with one another.

17. The conveyor according to claim 1,
 wherein one of said rigid parts is flexibly connected to one of said transversely elongated substantially rigid supporting elements, and another of said rigid parts is remote from said one of said transversely elongated substantially rigid supporting elements, and
 wherein an adjacent one of said movable cover flaps is adapted to slidably accommodate said another of said rigid parts and a portion of said one of said rigid parts,
 such that when said adjacent one of said movable cover flaps is positioned on an end pulley only said another of said rigid parts is accommodated by said adjacent one of said movable cover flaps, and when said adjacent one of said movable cover flaps is positioned in the transport portion both said another of said rigid parts and said one of said rigid parts are accommodated by said adjacent one of said movable cover flaps in a non-pivotable manner.

18. The conveyor according to claim 1, wherein each of said movable cover flaps projects beyond a side of a corresponding one of said transversely elongated substantially rigid supporting elements to extend over a corresponding adjacent one of said movable cover flaps, and further comprising a contact device to maintain said corresponding each of said movable cover flaps and said corresponding adjacent one of said movable cover flaps in contact with one another.

19. The conveyor according to claim 18, wherein said contact device is to allow a sliding movement between said each of said movable cover flaps and said corresponding adjacent one of said movable cover flaps.

20. The conveyor according to claim 19, wherein said contact device comprises a first magnetic element near an end of said each of said movable cover flaps, and a second co-acting magnetic element associated with said corresponding adjacent one of said movable cover flaps.

21. The conveyor according to claim 19, wherein said contact device comprises a first connecting element associated with said each of said movable cover flaps, and a second connecting element associated with said corresponding adjacent one of said movable cover flaps, with said first and second connecting elements being constructed and arranged to fix said each of said movable cover flaps and said corresponding adjacent one of said movable cover flaps in a direction perpendicular to the plane of transport of said endless conveyor belt and to allow a sliding movement of said each of said movable cover flaps and said corresponding adjacent one of said movable cover flaps in the direction of transport of said endless conveyor belt.

22. The conveyor according to claim 19, wherein said contact device includes an endless tying element to be arranged near each end pulley of the conveyor and guided around guide pulleys and over at least a side edge of said endless conveyor belt along a path where said endless conveyor belt is in contact with each said end pulley.

23. The conveyor according to claim 1, wherein said contact device includes at least an elongated flexible tying element extending along said transversely elongated substantially rigid supporting elements and said movable cover flaps and exerting a downward force on each of said movable cover flaps in a direction toward a respective one of said transversely elongated substantially rigid supporting elements.

* * * * *